Figure 1:
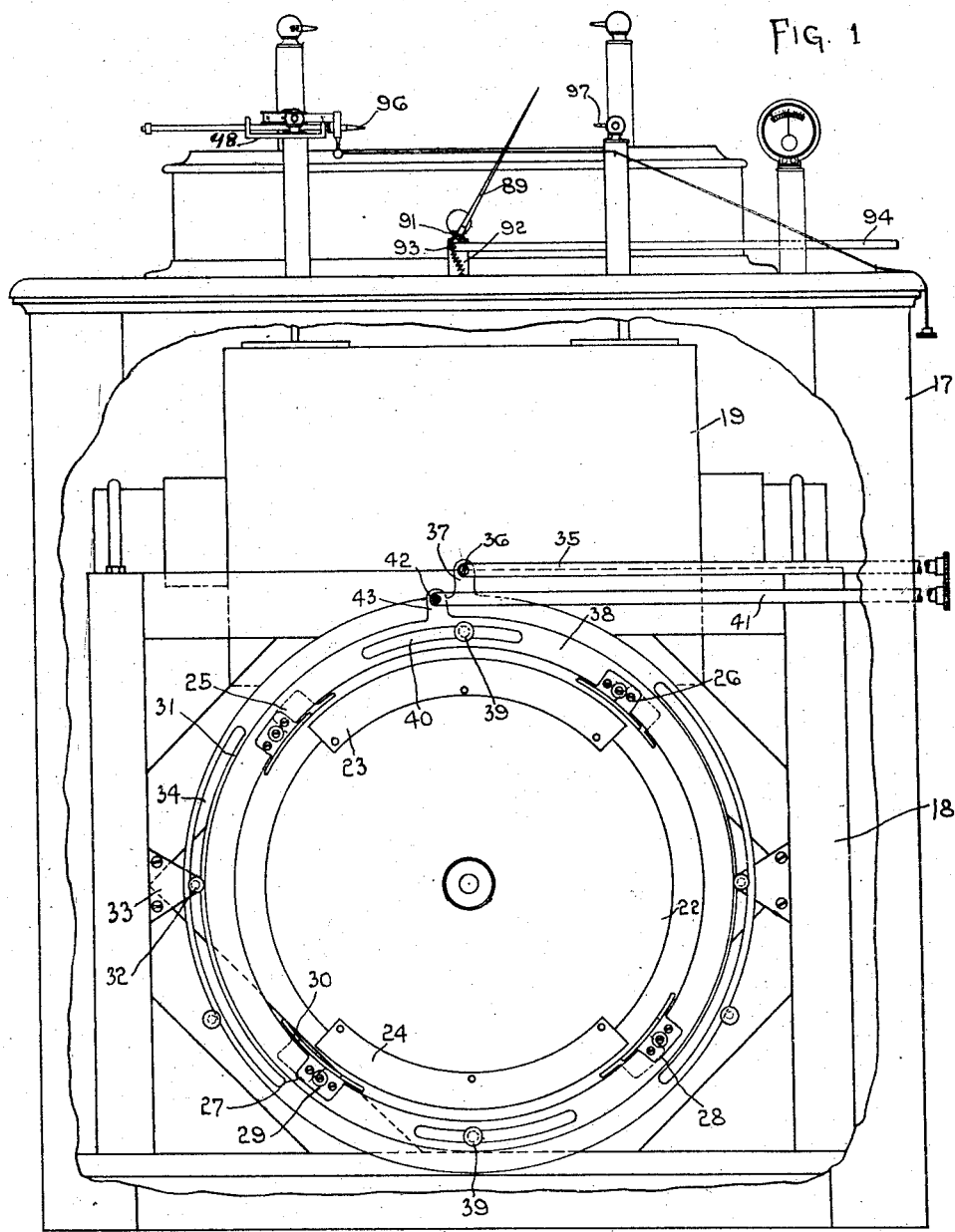

J. B. WANTZ.
CURRENT TRANSFORMING AND RECTIFYING APPARATUS.
APPLICATION FILED NOV. 5, 1914.

1,229,689.

Patented June 12, 1917.
5 SHEETS—SHEET 1.

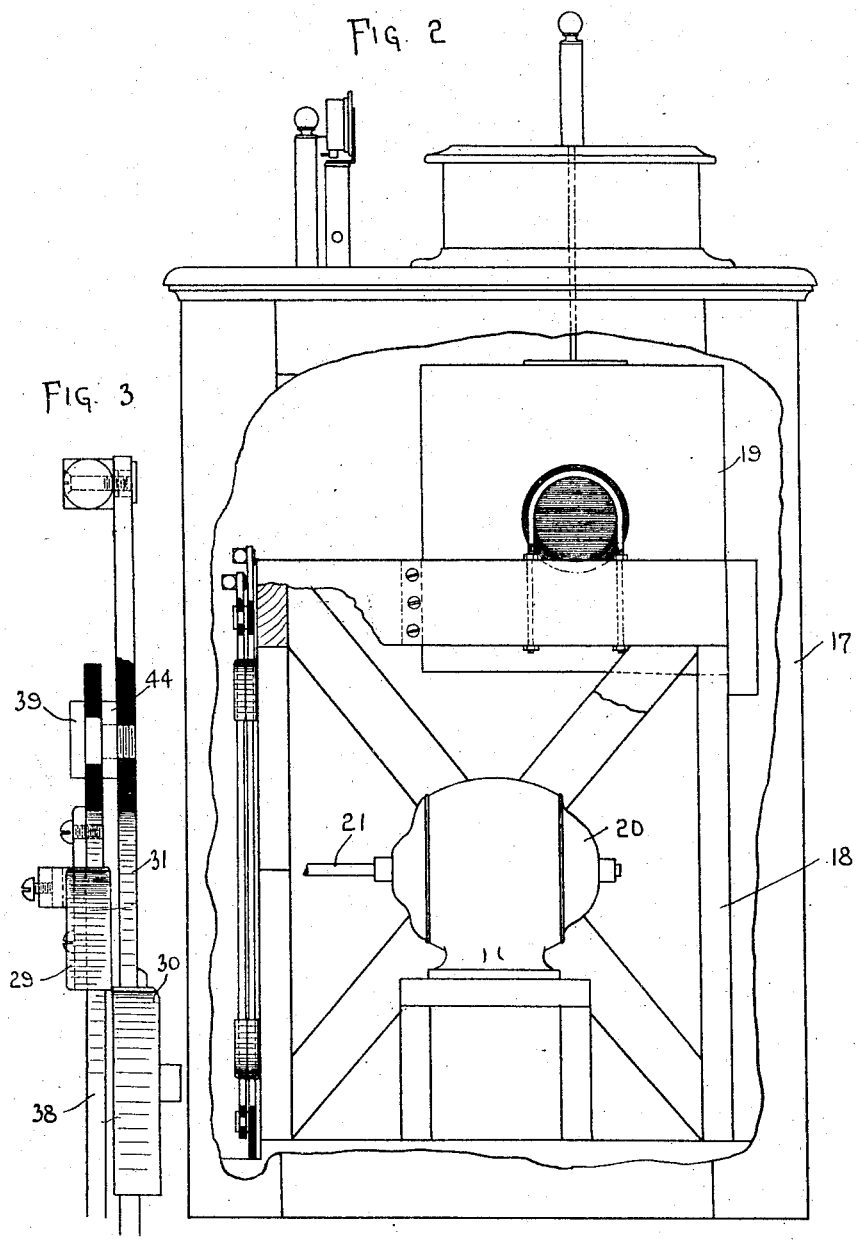

J. B. WANTZ.
CURRENT TRANSFORMING AND RECTIFYING APPARATUS.
APPLICATION FILED NOV. 5, 1914.
1,229,689.
Patented June 12, 1917.
5 SHEETS—SHEET 3.
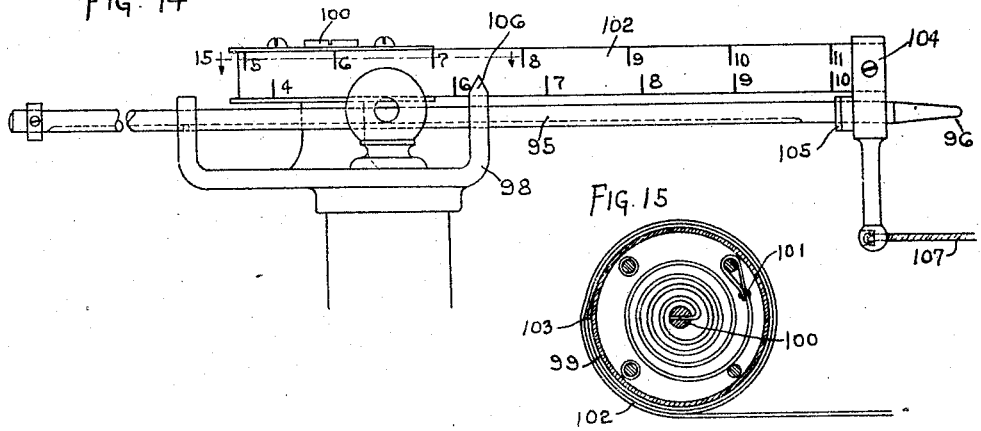
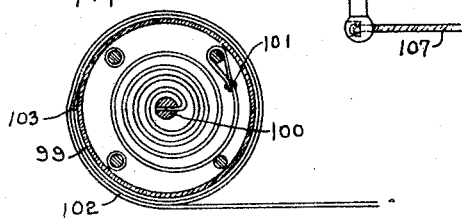
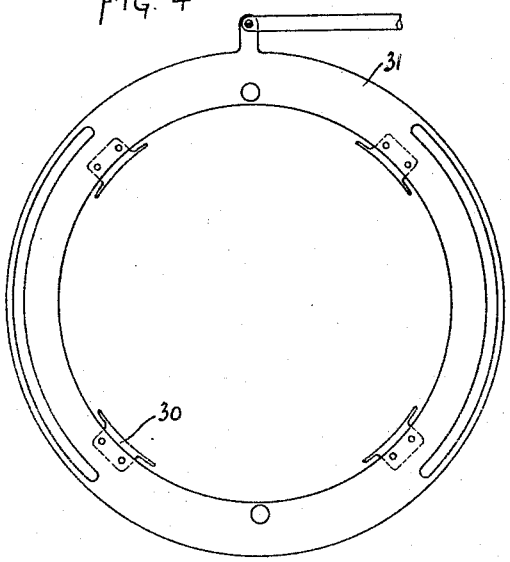
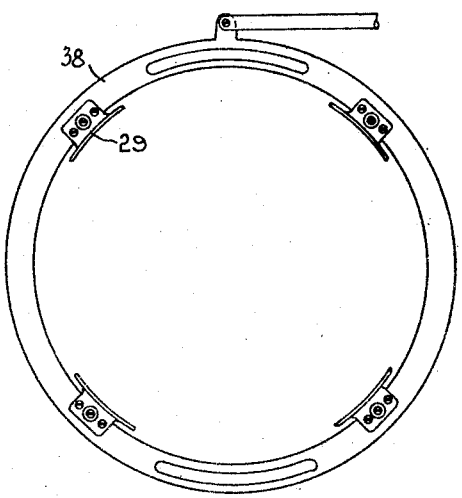
Inventor
Julius B. Wantz J. B. WANTZ.
CURRENT TRANSFORMING AND RECTIFYING APPARATUS.
APPLICATION FILED NOV. 5, 1914.

1,229,689.

Patented June 12, 1917.
5 SHEETS—SHEET 4.

Inventor
Julius B. Wantz

J. B. WANTZ.
CURRENT TRANSFORMING AND RECTIFYING APPARATUS.
APPLICATION FILED NOV. 5, 1914.

1,229,689.

Patented June 12, 1917.
5 SHEETS—SHEET 5.

Inventor
Julius B Wantz

Witnesses

UNITED STATES PATENT OFFICE.

JULIUS B. WANTZ, OF CHICAGO, ILLINOIS, ASSIGNOR, BY MESNE ASSIGNMENTS, TO VICTOR ELECTRIC CORPORATION, OF CHICAGO, ILLINOIS, A CORPORATION OF NEW YORK.

CURRENT TRANSFORMING AND RECTIFYING APPARATUS.

1,229,689.  Specification of Letters Patent.  Patented June 12, 1917.

Application filed November 5, 1914. Serial No. 870,391.

*To all whom it may concern:*

Be it known that I, JULIUS B. WANTZ, a citizen of the United States, residing at Chicago, in the county of Cook and State of Illinois, have invented a new and useful Improvement in Current Transforming and Rectifying Apparatus, of which the following is a specification.

My invention relates more particularly to apparatus for transforming low tension alternating current into high tension alternating current and rectifying the high tension alternating current into a pulsating high tension direct current, my improved apparatus having been designed for use more especially in connection with X-ray tubes, though it has utility in other connections, as will be readily understood by those skilled in the art.

The rectifying device usually employed in apparatus of this character comprises shoes spaced apart, certain of which are in circuit with the secondary of the transformer and the others with the X-ray tube, and rotary current-controlling means adapted to coöperate with said shoes for rectifying the current, the rotary means being driven usually by a synchronous motor (when the current supplied to the apparatus is alternating current) in such timed relation to the cycles of the alternating current, that the alternating current supplied thereto by the transformer will be rectified. Under the conditions of use a variable load is imposed on the transformer with the result of causing the current to lag relative to the voltage, the angle of the lag varying with the load, and therefore the position occupied by the above-referred to shoes relative to the rotary current-controlling means, when bearing the proper relation to the power-curve of the alternating current for a certain load on the transformer, will be ineffective for the most effective utilization of the current under conditions of variable loads. This lag of the current behind the voltage may also occur when power-consuming devices having different characteristics are interposed in the secondary circuit of the transformer.

Furthermore, it is often desirable to select a particular portion of the wave rectified, as, for instance, with a very high resistance X-ray tube in circuit it would be desirable to rectify each wave, beginning at its point of highest voltage and continuing throughout a portion of the remainder of the wave, the voltage gradually decreasing, and by supplying this character of direct current to the tube the most efficient results from the current are obtainable, in that the tube is quickly "broken down" and lighted for the longest possible interval. Also, in the case of X-ray treatment where it is desired that very soft rays be utilized, this may be accomplished by increasing the resistance in the primary circuit of the transformer and selecting those portions of the wave which represent the points of minimum power.

As apparatus have hitherto been constructed, it has been impossible to compensate for the lag above referred to, or to select for rectification different portions of the wave, and it is my primary object to overcome these objections in prior machines.

Furthermore, the intensity of the current supplied to the transformers of X-ray machines is so great that the rheostats as hitherto constructed, for varying the intensity of the current traversing the transformers, are not only expensive to manufacture but are very bulky, and the overcoming of this objection is another one of my objects.

Another of my objects is to provide means whereby the secondary induced voltage, in case of "trouble" in the circuits beyond the transformer, instead of short-circuiting in a manner which would impair the apparatus, and possibly endanger the operator, will be caused to travel a path exterior of the transformer, thereby avoiding damage to the apparatus, and where the said path is exposed to the view of the operator, apprising him of the improper operation of the apparatus.

Another object is to provide means on the apparatus whereby the "hardness" of the tube may be readily determined.

Another object is to provide in a single apparatus, means whereby the transformer may be operated to transform a current preliminary to its rectification, or operated as an induction coil by combining it with an interrupter, or operated independent of the interrupter or rectifier, there being certain conditions under which, in the operation of X-ray apparatus, it is desirable to use the varieties of currents produced by these several different methods of operation.

Referring to the accompanying drawings:

Figure 1 is a view in front elevation of transforming and rectifying apparatus constructed in accordance with my invention, a portion of the front of the casing being broken away to disclose the interior details. Fig. 2 is a view in side elevation of the structure shown in Fig. 1, the side of the casing being broken away to disclose interior details. Fig. 3 is enlarged edge-view of a portion of the shoe-supporting device for coöperation with the rotary current-controlling means which, in the construction shown, are in the form of an insulated disk carrying segments adapted to coöperate with said shoes this view showing the sections of the shoe therein illustrated, extended to the maximum degree. Fig. 4 is a face view of the innermost supporting ring for certain of the sections of the shoes. Fig. 5 is a similar view of a ring coöperating with the ring of Fig. 4 and carrying the other sections of said shoes. Figs. 6, 7, 8 and 9 are face views of the rings of Figs. 4 and 5 in assembled condition, these views showing the rings in different positions of adjustment relative to each other and to a vertical plane for rectifying varying lengths of the waves and varying portions of the waves. Figs. 10, 11, 12 and 13 are diagrams of power-curves showing by dotted lines the portions of the waves selected by adjusting the shoe-sections to the positions shown in Figs. 6 to 9 inclusive, respectively. Fig. 14 is a view in front elevation of means for determining the "hardness" of a tube. Fig. 15 is a section taken at the line 15 on Fig. 14 and viewed in the direction of the arrow, and Fig. 16 a diagrammatic view of my improved apparatus illustrating a manner of its use.

The casing for certain of the operative parts of the machine is illustrated at 17, this casing containing a frame 18 which supports a transformer represented at 19, of common and well-known construction, the primary winding of this transformer being connected with a rheostat and with a current-supplying line, as hereinafter explained. Supported in the casing 17 is a motor 20, which in the construction shown is a 4-pole self-exciting synchronous motor, the armature shaft 21 of which carries a disk 22 of insulating material provided with diametrically opposed segments of metal, 23 and 24, each extending across an angular distance of 90°, these segments being adapted to coöperate with equidistantly spaced shoes 25, 26, 27 and 28 grouped about the disk 22 and spaced a slight distance from the segments 23 and 24, these shoes being connected with the secondary of the transformer 19 and with electrical terminals adapted to be connected with the X-ray tube, all as hereinafter fully described. The shoes 25 to 28 inclusive, which are supported on the frame 18 to be stationary relative to the disk 22 are each formed of sections 29 and 30. The sections 30 are secured at intervals of 90° to the outer face of the ring 31 of insulating material supported on the frame 18, at pins 32 extending laterally from brackets 33 secured to the uprights of the frame, these pins extending through diametrically-opposed arc-shaped slots in the outer margin of the ring 31, whereby this ring may be adjusted about its axis for the purpose hereinafter described, this adjustment being effected through the medium of a rod 35 which extends at its outer end through the casing 17 and is pivotally connected at its inner end, as indicated at 36, with a lug 37 on the ring 31. The shoe sections 29 are likewise disposed at 90° to each other and are mounted on the ring 38 of insulating material which flatwise opposes the ring 31 and is held thereto by pins 39 which project through diametrically-opposed arc-shaped slots in the ring 38, whereby this ring may be adjusted about its axis upon the ring 31, for a purpose hereinafter explained, this adjustment being effected by means of a longitudinally shiftable rod 41 which extends at its outer end through the casing 17 and has pivotal connection, as indicated at 42, with a lug 43 on the ring 38, the shoe-sections 29 and 30 being offset from each other as indicated in Fig. 3 to permit them to be moved into varying overlapping positions relative to each other, as illustrated; and washers 44 surrounding the pins 39 and disposed between the rings 31 and 38 and spacing these rings from each other. It will be understood, therefore, that not only may the shoes be bodily shifted into varying positions about the axis on which the disk 22 rotates, but the sections of each shoe may be adjusted relative to each other for lengthening or shortening the effective surfaces of the shoes.

Figure 16:
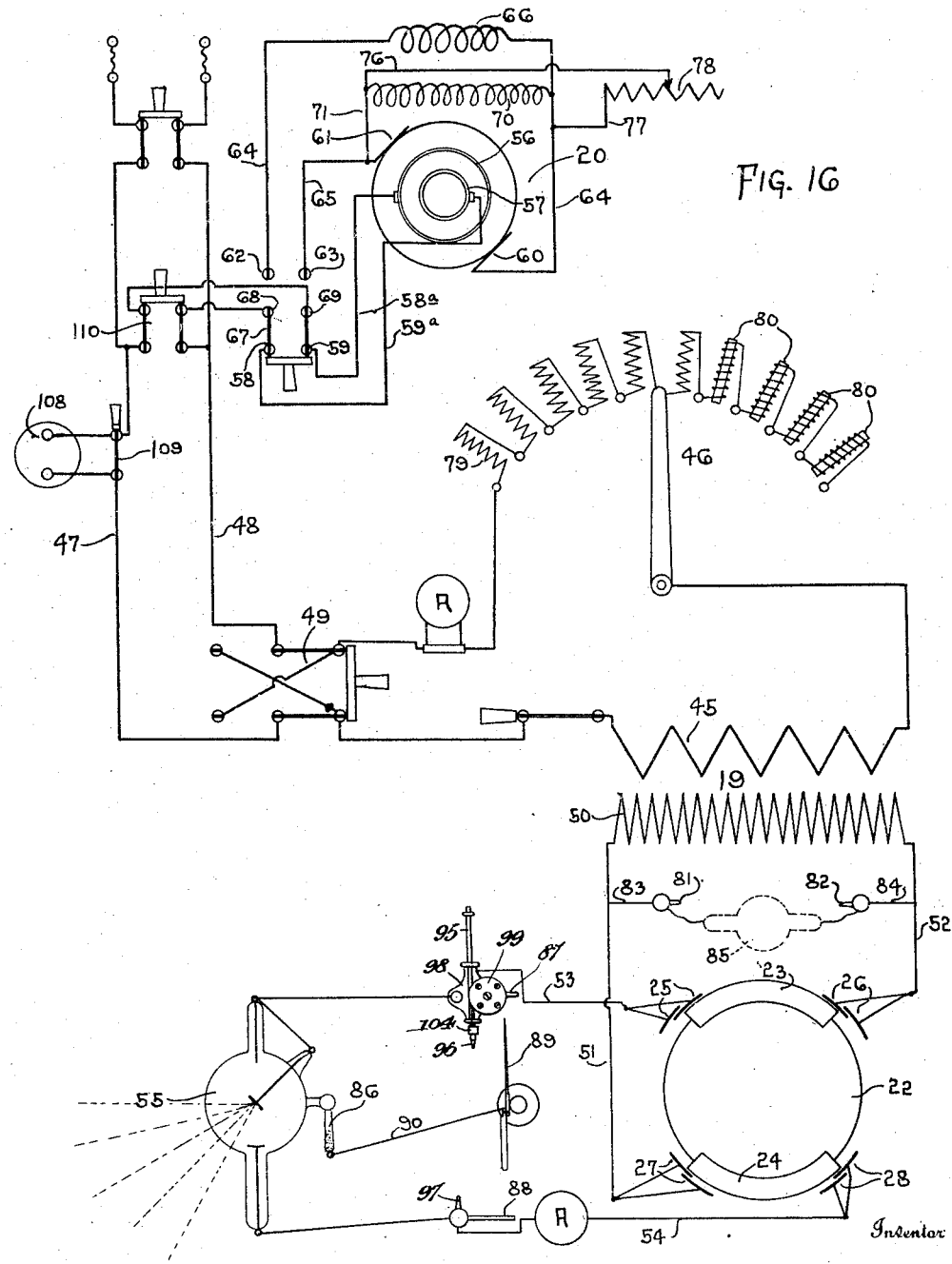

Certain parts of the apparatus illustrated and the circuit connections thereof are of such common use that they have been illustrated merely diagrammatically in the diagram shown in Fig. 16, and therefore certain parts of the apparatus will be described in connection with a description of the diagram.

The primary of the transformer 19 is represented at 45 and is connected in series with a rheostat represented at 46 and preferably of the construction hereinafter described, the main line wires for conducting alternating current to the primary 45 being represented at 47 and 48, a pole-changer of the ordinary construction being represented at 49 as interposed in circuit with the primary 45 and the rheostat 46. The secondary of the transformer 19 is represented at 50, one of the terminals of the secondary being connected with the sections 29 and 30 of the shoe 27 through the medium of the wire 51 and the other terminal of the secondary being connected with the sections of the shoe 26 through the medium of the wire 52, the other shoes, 25 and 28, being connected with wires 53 and 54, respectively, for conducting the rectified current to the point of use, as, for example, to an X-ray tube represented at 55 which is connected at its opposite terminals with the wires 53 and 54.

As is well understood in the art, the disk 22 should be driven at such a speed that it will make one revolution for each two cycles of the alternating current traversing the secondary 50, and this may be accomplished in any desirable manner, either by driving the disk 22 by a synchronous motor, synchronized to the alternations in the secondary 50, or in any other suitable way. In the diagram the motor 20, which is of the common construction above referred to, is connected at its slip-rings 56 and 57 with contacts 58 and 59, respectively, by wires 58ª and 59ª, and at its commutator brushes 60 and 61 with contacts 62 and 63 by wires 64 and 65, respectively, the wire 64 containing the series field represented at 66. By means of a switch 67 the contacts 58 and 59 or 62 and 63 may be cut into the line 47 and 48 connected with the contacts 68 and 69 of the switch 67 for supplying alternating current to either the brushes 60 and 61 or the slip-rings 56 and 57.

The main, or shunt field of the motor is represented at 70 and is connected with a wire 71 connected with the brush 61 and with the wire 64.

In starting the motor, the switch 67 is first thrown into engagement with the contacts 62 and 63 which drives the motor through the brushes 60 and 61. As soon as the motor has speeded up practically to synchronism with the alternations of the current traversing the transformer the operator moves the switch 67 out of engagement with the contacts 62 and 63 and into engagement with the contacts 58 and 59, thus directing the current through the slip-rings 56 and 57, whereby the motor runs as a synchronous motor, driving the disk 22 in timed relation to the alternations of the current traversing the transformer, as hereinbefore stated. The pole-changer 49 is provided for the well-known purpose of insuring the passage of the current in the desired direction through the circuit traversed by the rectified current.

In the operation of the apparatus, in so far as the same has been described, the alternating current supplied by the line wires 47 and 48 traverses the primary 45 and rheostat 46, thereby inducing alternating current of high voltage in the secondary 50. As the disk 22 moves the segments 23 and 24 to positions in which they bridge the spaces between the shoes 25, 26, 27 and 28, respectively, as shown in the diagram, the current passes from the secondary 50 to either the shoe 26 or 27, depending on the direction of the current through the secondary 50 at the time the disk 22 becomes synchronized with the current. Assuming, however, that the current passes from the secondary 50 to the shoe 26 through the wire 52 when the disk 22 is in the position represented in the diagram (this being the direction which the current should take in the particular arrangement illustrated and which direction may be insured by operating the pole-changer 49, if necessary, as is well understood in the art), the current passes from the shoe 26 through the segment 23, thence to the shoe 25, wire 53, through the tube 55, wire 54, shoe 28, segment 24, shoe 27 and wire 51 back to the secondary 50. The next alternation of the current will cause it to flow out of the other end of the secondary 50, the disk 22, while such alternation is occurring, moving in synchronism with said alternation to the position in which its segment 23 bridges the shoes 26 and 28 and its segment 24 bridges the shoes 25 and 27, thereby causing the current passing from the wire 51 to the shoe 27 to traverse the segment 24, the current thus passing to the shoe 25, wire 53, tube 55, wire 54, shoe 28, segment 23, shoe 26 and wire 52 to the other end of the secondary 50. Thus a pulsating direct current is delivered to the circuit in which the tube 55 is interposed. This operation of the rectifier which embraces the rectification of one cycle of alternating current being repeated throughout the operation of the device.

As hereinbefore stated, variations in the load on the secondary 50 causes the current to lag relative to the voltage, and thus to obtain the greatest efficiency from the current it is necessary that this lag be compensated to as great a degree as possible. This may be accomplished by adjusting the shoes 25 to 28 inclusive about the axis of the disk 22 to the desired position, depending upon the amount of lag, or it may be accomplished in any other suitable manner, as, for example, by inserting in a shunt circuit about the field 70 any desirable resistance whereby the armature of the motor 20 will be caused to lag, or providing for the adjustment of the field about the armature. In the arrangement illustrated in the accompanying drawing certain of the above-referred to means are provided, and under certain conditions their coöperation with each other in a single apparatus is desirable, or, it will be readily understood, they are adapted to be employed separately.

In Figs. 6 to 13, inclusive, I have illustrated certain adjustments of the shoes for causing different portions of the alternating current waves to be rectified for varying the amount of those portions of the waves which are rectified, and for varying the points on the waves at which rectification takes place; and in this connection have illustrated opposite each of the figures showing varying positions of the shoes, diagrams showing the portions of the power-curve rectified.

Figure 6:
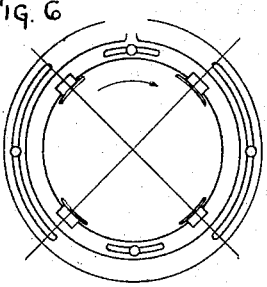
Figure 10:
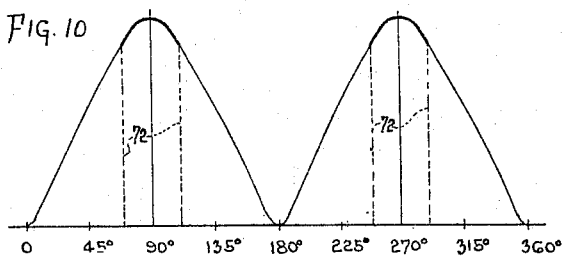

In Fig. 6 I have shown the shoes with their sections so adjusted that a minimum portion of the alternating current wave is rectified. The chart shown in Fig. 10 represents a power-curve of a circuit wherein the voltage and current curves pass through their maximum and zero points at the same instants, or, in other words, where no lag in the current relative to the voltage is present. With the shoes set as illustrated in Fig. 6 the portion of maximum power will be rectified, that portion of the wave which is rectified being bounded within the dotted lines 72.

Figure 7:
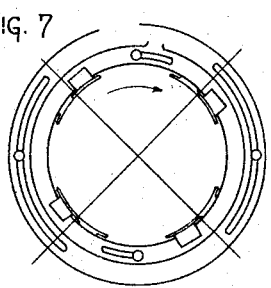
Figure 11:
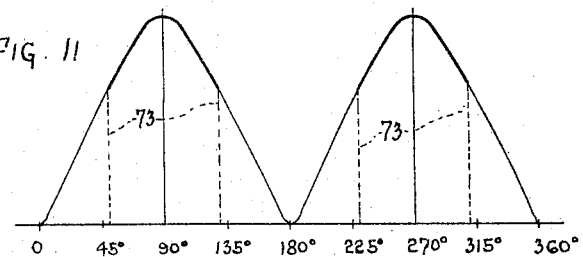

In Fig. 7 the sections of the shoes are adjusted relative to each other to rectify to the maximum extent the alternating current wave where, owing to the conditions of operation, there is no lag in the current. In this case that portion of the wave which is bounded by the dotted lines 73 will be the part rectified.

Figure 8:
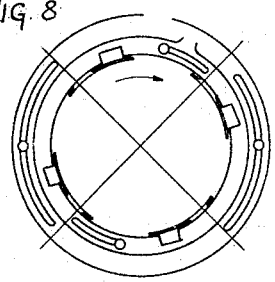
Figure 12:
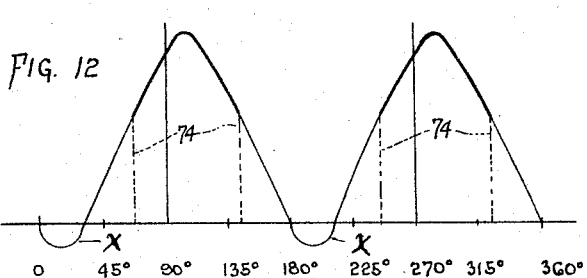

Fig. 8 represents the sections of the shoes adjusted relative to each other and about the axis of the rotary member 22 for compensating for a certain degree of lag in the current. This adjustment of the shoes is merely illustrative of one of the many which may be made for compensating for lag, but is desirable where the conditions present correspond with the power-curve chart illustrated in Fig. 12, wherein, by reason of the lag of the current behind the voltage, the apex of the power-curve is not reached until the voltage wave has passed over 90°. The portions $x$ of the curves below the horizontal line in Fig. 12 are what are called "reverse power loops" and the areas bounded by these curves represent power returned to the source of energy by the power-consuming device. By adjusting the shoes as shown in Fig. 8, the ends of the segments 23 and 24 are brought into registration with points intermediate the lengths of the shoes in such timed relation to the voltage wave that those portions of the waves which are of the greatest power are rectified, the chart shown in Fig. 12 indicating by dotted lines 74 the boundaries of that portion of the wave which is rectified. The sections of the shoes are shown in Fig. 8 as spaced the maximum distance apart for effecting rectification to the maximum degree of an alternating current wave, though it will be readily understood that this feature of adjusting the shoes about the axis of the member 22, as explained of the adjustment in Fig. 8, is one which may be made entirely independent of adjusting the sections of the shoes to vary their effective lengths.

Figure 9:
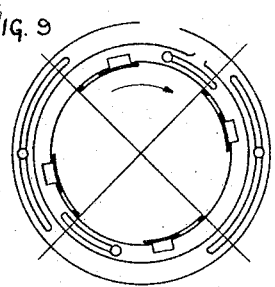
Figure 13:
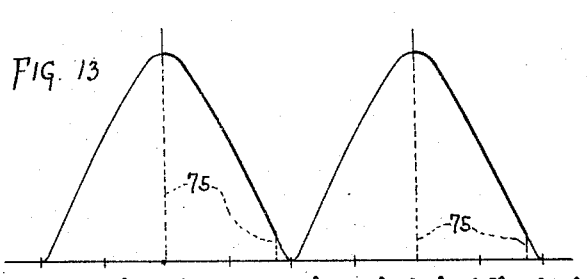

Fig. 9 represents an adjustment of the shoes about the disk 22, and also an adjustment of the sections of the shoes relative to each other for rectifying to the maximum degree an alternating current wave and varying the point on the wave at which rectification begins. The power-curve chart illustrated in Fig. 13 shows a condition in which no lag exists, the power curve therein shown corresponding with the power curves in Figs. 10 and 11. The position of the shoes in Fig. 9 is such that rectification of the wave begins at the highest point on the wave and ends closely adjacent to the zero point, the portion of the wave rectified being bounded between the dotted lines 75 on this chart.

It will be understood from the foregoing, wherein I have sought by certain examples to demonstrate the adaptation of my improved apparatus to varying conditions, that not only may lag in the current be compensated to utilize to the maximum degree the power supplied by the transformer, but the apparatus also serves as a selective device whereby the point on the wave at which rectification begins may be varied as desired and those portions of the wave which are rectified likewise varied, to rectify longer or shorter sections of the wave as desired, which renders the apparatus very flexible to varying conditions of use, especially when used to supply current to X-ray tubes.

Compensation for lag in the current may also be effected by providing resistance in a shunt of the field 70, as hereinbefore stated. In the diagram represented in Fig. 16 this shunt-circuit is formed of a wire 76 connected at one end with the field 70, and a wire 77 connected with the wire 64 between the field 70 and the brush 60, there being interposed between the wires 76 and 77 and in circuit therewith a rheostat 78. It will be readily understood that by shifting the movable contact of this rheostat the resistance of this shunt-circuit may be varied, which will cause the armature of the motor 20 to lag to a degree depending on the amount of resistance in this circuit, thereby producing lag in the rotation of the disk 22 relative to the voltage curve proportional to the resistance presented by said shunt-circuit.

In apparatus of this general type, heavy currents are usually supplied to the transformer 19, the rheostat 46 being provided for regulating the amount of current supplied to the primary 45; it being desirable, under varying conditions, to vary the intensity of the current supplied to the primary, through relatively great ranges, with large graduations of the rheostat at the high resistance end thereof and relatively fine graduations at the low resistance end thereof. In order to avoid the necessity of employing the cumbersome and expensive forms of rheostat hitherto used for heavy currents, I preferably provide a rheostat constructed as follows: The rheostat is formed of a series of coils 79 of the resistance wire usually employed and connected in series as shown in the diagram. The low resistance end of the rheostat has its coils 79 of such resistance that the desired fine graduations of resistance may be obtained, whereas the coils at the high resistance end of the rheostat surround metal magnetic cores 80, insulated from the surrounding coils and preferably of laminated iron. The coils 79 and the coöperating cores 80 are in effect combined resistance and choke coils, the cores 80 serving to greatly intensify the voltage-reducing effect of the surrounding coils. Thus the combined resistance and choke coils provide the relatively large graduations at the high resistance end of the rheostat, producing with the resistance coils at the low resistance end of the rheostat a combination of voltage-reducing elements which will permit of the control of the current passing through the primary 45 in a manner desirable in apparatus of the character specified, and the rheostat as a whole will be very compact and economical of manufacture.

In the apparatus illustrated provision is made for the passing of the transformed alternating current in a path exterior of the transformer, in case the rectifying apparatus becomes disordered, in order that damage to the apparatus or injury to the operator be avoided. This is accomplished in the construction illustrated by providing in the wires 51 and 52 spaced terminals 81 and 82 connected to these wires by wires 83 and 84. These terminals are so spaced that the current will not jump from one to the other thereof unless it becomes of such intensity as to exceed that required for the operation of the device interposed in the circuit traversed by the rectified current. Furthermore, if desired, the terminals of the wires 83 and 84 may be used as terminals for an X-ray tube represented at 85, capable of being operated on an alternating current.

It is also desirable in some cases to reduce the vacuum of the tube, which is generally effected by the passage of a current through a chemical, in a tube-extension 86 of the tube 55, of a character which will liberate gas when a current is passed therethrough, this being common practice. I prefer to adapt the apparatus illustrated to provide for the passage of current through the tube-extension 86 for the purpose above stated, by providing contact points 87 and 88 in the wires 53 and 54, respectively, with a swinging contact 89 adapted to be moved into engagement with either of the contacts 87 or 88. The contact 89, which is connected with a wire 90 leading into the tube-extension 86, is pivotally supported, as indicated at 91, on a standard 92 secured to the top of the casing 17, and is pivotally connected, as indicated at 93, with a longitudinally shiftable member 94 for operating the contact 89, as above stated.

X-ray tubes are generally classified according to their relative "hardness"; in other words, their relative resistance to the passage of current therethrough, and it is highly desirable that the operator of an X-ray machine be apprised of the "hardness" of the tube before he begins operations. In the apparatus illustrated means are provided whereby the relative "hardness" of a tube may be readily determined. These means, which are interposed in the direct-current circuit, comprise a sliding rod 95 of electric-current-conducting material provided with a terminal-end 96 which opposes a terminal end 97 on the contact 88, this rod being mounted to slide in a U-shaped member 98 electrically connected with the contact 87, a hollow tape-reel 99 rotatably mounted on a spindle 100 secured to the member 98 and containing a coil-spring 101 which serves to rotate the reel 99 in a clockwise direction, and a tape 102 affixed at one end indicated at 103 to the reel and at its opposite end to an arm 104 connected with the outer end of the rod 95, the spring 101 operating to roll up the tape 102 on the reel 99 and draw the member 95 and arm 104 to a position in which said arm bears against one of the arms of the member 98 at a rubber bumper 105 on the arm 104. The tape 102 in the construction illustrated has two scales imprinted thereon, the upper scale being calibrated in scales of "hardness" and the lower scale calibrated in inches, these scales coöperating with a pointer 106 provided on the upper end of one of the arms of the member 98. The principle of the calibrations on the upper scale is based on the standard of "hardness" and the lower scale is based upon the distance between terminals 96 and 97.

To operate the mechanism just described, the operator after positioning the tube 55, to be tested, in the rectified current circuit, assuming the transformer and rectifier to be operating, shifts the rod 95 to the right in Figs. 1 and 14, as by drawing on a cord 107 secured to the lower end of the arm 104, until a spark jumps across the terminals 96 and 97. The operator, while holding the rod 95 in its shifted position, reads either scale, the upper scale opposite the pointer 106 indicating the degree of "hardness" by number and the lower scale the distance between the terminals 96 and 97.

In the apparatus illustrated provision is also made for operating the transformer as an induction coil where it is desirable to use the very high potentials which are thus produced by the transformer, these means in the construction shown comprising an interrupter 108, of any suitable construction, adapted to be cut into and out of the line wire 47 by means of a switch 109.

Furthermore, by the provision of the apparatus as described, both the motor 20 and the interrupter 108 may be thrown out of circuit, if desired, the interrupter by opening the switch 109 and the motor by opening the switch 110, where it is desirable to operate an X-ray tube requiring the kind of current which would be produced by the operation of the transformer under the conditions just stated. The operation of the transformer in this manner would be useful in cases of emergency, as, for example, should trouble occur in the rectifying mechanism, and also for therapy work where the highest possible potential is necessary, the operation of the transformer in this way eliminating any losses occurring by passing the current through the rectifying mechanism.

In the arrangement as illustrated, the current supplied by the line to the apparatus as a whole, is alternating current, but it will be manifest to those skilled in the art that the apparatus may be used when the current supplied to it for operation is direct current, in which any suitable rectifying means, as, for example, an inverted rotary converter, may be employed, converting the direct current into alternating current for delivery to the transformer, and the rotary member of the rectifier driven in any suitable manner in synchronism with the current supplied by the transformer, as by driving it from the shaft of the rotary converter.

While I have illustrated and described a particular embodiment of my invention, I do not wish to be understood as intending to limit it thereto, as the same may be variously modified and altered without departing from the spirit of my invention.

What I claim as new and desire to secure by Letters Patent is:—

1. In apparatus of the character set forth, the combination of a source of alternating-current supply, and rectifying means comprising current-conducting shoes spaced apart, and each formed of relatively adjustable sections, certain of said shoes being connected with said supply, a rotary member carrying current-conducting members adapted to coöperate with said shoes, and means for driving said rotary member in synchronism with said alternating current.

2. In apparatus of the character set forth, the combination of a source of alternating-current supply, and rectifying means comprising current-conducting shoes spaced apart, certain of said shoes being connected with said supply, a rotary member carrying current-conducting members adapted to coöperate with said shoes, each of said shoes being formed of sections adjustable relative to each other and to said rotary member whereby the effective length of said shoes and their position about the axis of said rotary member may be varied, and means for driving said rotary member in synchronism with said alternating current.

3. In apparatus of the character set forth, the combination of a source of alternating-current supply, and rectifying means comprising current-conducting shoes spaced apart and extending in substantially the same plane, each of said shoes being formed of relatively adjustable sections and certain of said shoes being connected with said supply, a rotary member carrying current-conducting members extending in substantially the same plane and adapted to coöperate with said shoes, and means for driving said rotary member in synchronism with said alternating current.

4. In apparatus of the character set forth, the combination of a source of alternating-current supply, and rectifying means comprising current-conducting shoes spaced apart and extending in substantially the same plane, certain of said shoes being connected with said supply, a rotary member carrying current-conducting members extending in substantially the same plane adapted to coöperate with said shoes, each of said shoes being formed of sections adjustable relative to each other and to said rotary member, whereby the effective length of said shoes and their position about the axis of said rotary member may be varied, and means for driving said rotary member in synchronism with said alternating current.

5. In apparatus of the character set forth, the combination of a source of alternating-current supply, and rectifying means comprising current-conducting shoes spaced apart, certain of said shoes being connected with said supply, a rotary member carrying current-conducting members adapted to coöperate with said shoes, each of said shoes being formed of sections slidable lengthwise of each other and each movable circumferentially of said rotary member, and means for driving said rotary member in synchronism with said alternating current.

6. In apparatus of the character set forth, the combination of a source of alternating-current supply, and rectifying means comprising current-conducting shoes spaced apart, certain of said shoes being connected with said supply, a rotary member carrying current-conducting members adapted to coöperate with said shoes, each of said shoes being formed of sections slidable lengthwise of each other and each movable circumferentially of said rotary member, whereby the effective length of said shoes and their position about the axis of said rotary member may be varied, and means for driving said rotary member in synchronism with said alternating current.

7. In apparatus of the character set forth, the combination of current-conducting shoes spaced apart and each formed of relatively adjustable sections, and a rotary member carrying current-conducting members adapted to coöperate with said shoes.

8. In apparatus of the character set forth, the combination of current-conducting shoes spaced apart and each formed of relatively adjustable sections, and a rotary member carrying current-conducting members adapted to coöperate with said shoes, said shoes being adjustable about the axis of said rotary member, for the purpose set forth.

9. In apparatus of the character set forth, the combination of a member adapted to be rotatably adjusted and carrying current-conducting members, a second member adapted to be rotatably adjusted and carrying current-conducting members, said first-named and said last-named current-conducting members being arranged in sets to form sectional shoes spaced apart, and a rotary member carrying current-conducting members adapted to coöperate with said shoes.

10. In apparatus of the character set forth, the combination of a member adapted to be rotatably adjusted and carrying current-conducting members, a second member supported on said first-named member and rotatably adjustable thereon and carrying current-conducting members, said first-named and said last-named current - conducting members being arranged in sets to form sectional shoes spaced apart, and a rotary member carrying current - conducting members adapted to coöperate with said shoes, said first and second-named members being adjustable together about the axis of said rotary member.

11. In apparatus of the character set forth, the combination of a ring rotatably mounted and carrying current-conducting members, a second ring rotatably supported on said first-named member and carrying current-conducting members, said first-named and last-named current-conducting members being arranged in sets to form sectional shoes spaced apart, and a rotary member carrying current-conducting members adapted to coöperate with said shoes, said first and second named rings being adjustable together about the axis of said rotary member.

12. In apparatus of the character set forth, the combination of a source of alternating-current supply, a transformer connected with said source, rectifying means connected with the secondary of said transformer, and means for short-circuiting the current across the line leading from the secondary of the transformer to said rectifying means when the voltage across the secondary of said transformer exceeds a predetermined intensity.

13. In apparatus of the character set forth, the combination of a source of alternating-current supply, a transformer connected with said source, rectifying means connected with the secondary of said transformer, sparking terminals connected with the opposite sides of the line leading from the secondary of the transformer to said rectifying means and spaced apart to cause the transformed current to traverse the gap between said terminals when the voltage across the secondary of said transformer exceeds a predetermined intensity.

14. In apparatus of the character set forth, the combination of a source of alternating current, a transformer connected therewith, rectifying means for rectifying the transformed current including a motor connected with said source, with a switch controlling the supplying of current to said motor, and an interrupter in the line leading from said source to said transformer with means for throwing said interrupter into and out of said line.

JULIUS B. WANTZ.

In presence of—
   JAMES S. THELEN,
   E. HUMPHREY.

Copies of this patent may be obtained for five cents each, by addressing the "Commissioner of Patents, Washington, D. C."